Sept. 9, 1958 J. B. MOOR 2,851,325
SAFETY CONTAINER FOR VOLTAGE CONTROL UNIT
Filed Aug. 1, 1957 2 Sheets-Sheet 1

INVENTOR
JOSEPH H. MOOR

BY Kimmel & Crowell

ATTORNEYS

Sept. 9, 1958  J. B. MOOR  2,851,325
SAFETY CONTAINER FOR VOLTAGE CONTROL UNIT
Filed Aug. 1, 1957  2 Sheets-Sheet 2

INVENTOR
JOSEPH B. MOOR
BY
Kimmel & Crowell
ATTORNEYS

United States Patent Office 2,851,325
Patented Sept. 9, 1958

2,851,325

SAFETY CONTAINER FOR VOLTAGE CONTROL UNIT

Joseph B. Moor, Birmingham, Ala.

Application August 1, 1957, Serial No. 675,742

3 Claims. (Cl. 312—293)

The present invention relates to safety containers for voltage control units of the type used on tractor trailer vehicles.

Many tractor truck manufacturers are now equipping their vehicles with 12 volt battery systems. Trailers for use with truck tractors are customarily equipped with a 6 volt lamp system, and since they may be pulled by a truck tractor with either a 6 or 12 volt battery system, a voltage control device is necessary to permit the operation of a 6 volt lamp system from a tractor having a 12 volt battery system.

There are several devices presently on the market for the purpose of reducing the 12 volt current for use in 6 volt lamp system which consist principally of a variable resistor or rheostat arranged for adjustment by the driver in accordance with the number of lights carried by the trailer. In normal use these devices have proven unsatisfactory since they depend upon the judgment of the driver which is often insufficient to obtain a correct setting of the control. Obviously, if too much electric energy is fed to the lamps of the trailer either the protecting fuse will blow, or the lamps will blow out immediately. A second major disadvantage of the present devices on the market is that unauthorized persons can cause the trailer lights to burn out by setting the control too high, and thus cause a breakdown of the truck trailer combination.

The primary object of the invention is to provide a container for a voltage control which is tamper proof and which will prevent unauthorized persons from causing breakdowns without leaving evidence as to the cause of the breakdown.

Another object of the invention is to provide a voltage control container which is inexpensive to manufacture, simple to use, and which can be adapted to a great variety of voltage control problems.

Other objects and advantage will become apparent in the following specification when considered in the light of the attached drawings, in which.

Figure 1:
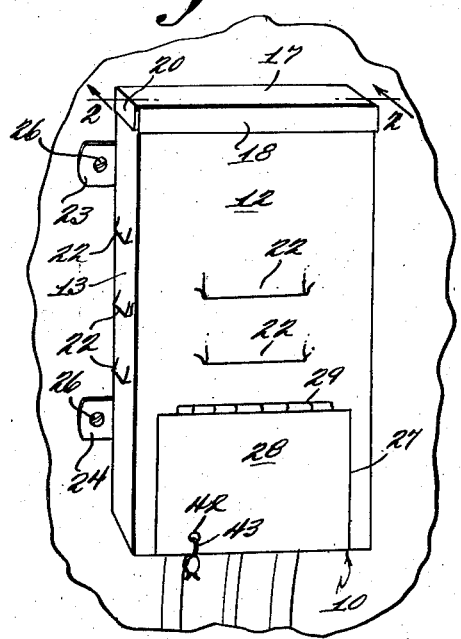
Figure 1 is a perspective view of the invention.
Figure 4:
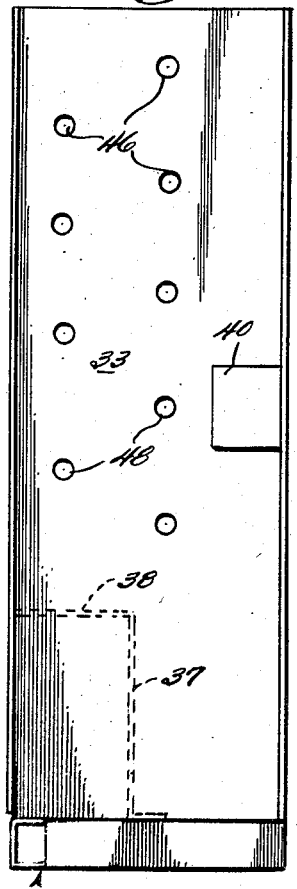
Figure 4 is an end elevation of the control support frame shown removed from the container.
Figure 5:
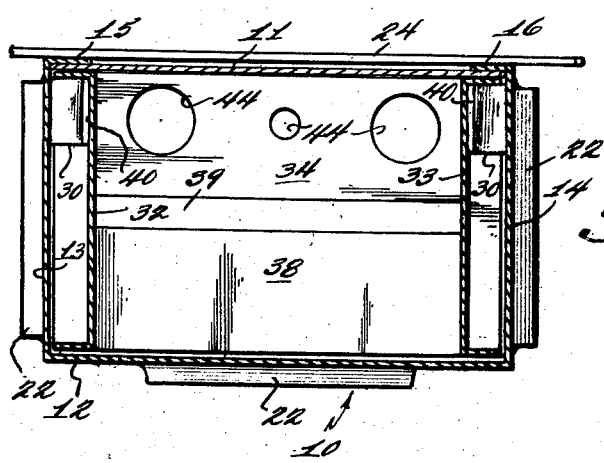
Figure 5 is a horizontal cross-section taken along the line 5—5 of Figure 2, looking in the direction of the arrows.

Referring now to the drawings in detail wherein like reference characters indicate like parts throughout the several figures, the reference numeral 10 indicates generally a voltage control container constructed in accordance with the invention.

The container 10 includes a generally rectangular upright rear wall 11, a front wall 12 arranged in spaced parallel relation thereto and having a pair of opposite side walls 13, 14 integrally formed on the opposite side edges thereof and extending perpendicularly thereto. The side walls 13, 14 each carry a vertical flange 15, 16, respectively, on the rear edges thereof in overlying relation to the rear wall 11. The flanges 15, 16 are secured to the opposite sides of the rear wall 11 to form a generally rectangular upright hollow tube.

A rectangular cover 17 is provided with depending front and rear flanges 18, 19, respectively, and depending opposite side flanges 20, 21, respectively. The cover 17 has its flanges 18, 19, 20, 21 telescopically engaged over the walls 11, 12, 13 and 14, and are secured thereto by welding or the like.

The front wall 12 and the side walls 13, 14 are provided with a plurality of stamped ventilating louvers 22 to permit ventilating air to enter the container 10.

A pair of mounting bars 23, 24 are secured to the flanges 15, 16 in vertically spaced horizontal relation by welding or other suitable means. The mounting bars 23, 24 have their opposite ends extending beyond the side walls 13, 14 and provided with bores 25 to receive attaching members 26 to secure the container 10 to a portion of the tractor vehicle.

The front wall 12 is provided with a rectangular opening 27 extending to the lower edge thereof. A door 28 is secured to the front wall 12 by a hinge structure 29 which has its axis in a horizontal plane.

A spring finger 30 is secured to each of the side walls 13 and 14 with the lower end portions of the fingers 30 welded to the lower inner faces of the side walls 13 and 14. The spring fingers 30 extend inwardly and upwardly from the side walls 13 and 14, respectively, for reasons to be assigned.

A rectangular control mount, generally indicated at 31, is provided with a pair of opposed channel-shaped side walls 32, 33 arranged in spaced parallel relation. A channel-shaped bottom wall 34 extends perpendicularly to the side walls 32, 33 and is welded to the lower ends thereof to secure the side walls 32, 33 together.

The channel-shaped bottom wall 34 is provided with a depending rear flange 35 and a depending L-shaped forward flange 36. A vertical partition 37 extends between the side walls 32, 33 intermediate the front and rear portions thereof and is secured thereto by welding.

A horizontal partition 38 is integrally formed with the upper edge of the vertical partition 37 and extends perpendicularly forwardly therefrom between the side walls 32, 33. The lower end of the vertical partition 37 is provided with a right angularly extending foot portion 39 which is welded to the bottom wall 34 to assist in supporting the vertical partition 37 between the side walls 32, 33.

The control mount 31 is slid upwardly into the container 10 through the open bottom thereof with the spring fingers 30 engaging the side walls 32, 33 of the control mount 31. The side walls 32, 33 are each provided with detent blocks 40 which engage over the upper ends of the spring fingers 30 to lock the control mount 31 in the container 10, effectively preventing the removal of the control mount 31 from the container 10 by any ordinary means.

Figure 3:
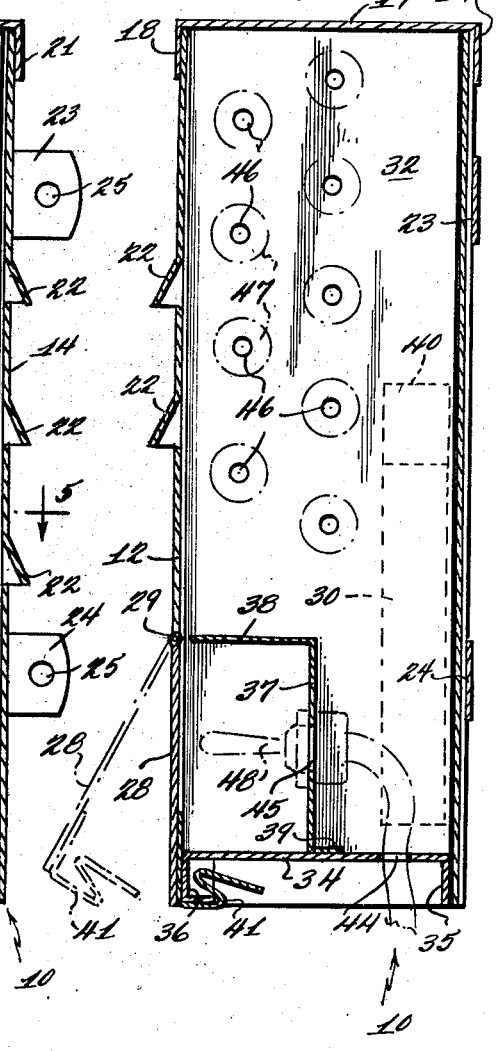
Figure 3 is a transverse vertical cross-section taken along the line 3—3 of Figure 2, looking in the direction of the arrows.

A spring latch 41 is secured to the inner face of the door 28 at the lower end thereof and is arranged to engage over the L-shaped flange 36, as shown in Figure 3, to hold the door 28 in closed position. A bore 42 extends through the door 28 and through the L-shaped flange 36 to permit the door 28 to be locked or sealed in closed position by a member 43 extending through the bore 42.

The bottom wall 34 of the control mount 31 is provided with a plurality of cable bores 44 and the vertical partition 37 is provided with a plurality of switch mount bores 45.

Figure 2:
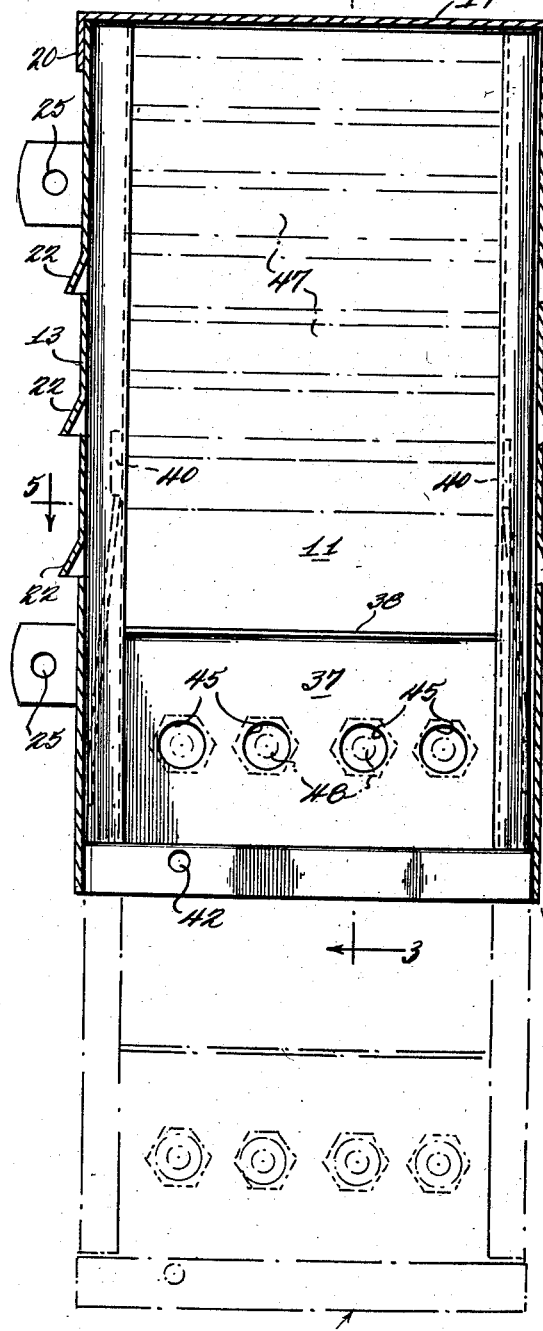
Figure 2 is an enlarged vertical cross-section taken along the line 2—2 of Figure 1, looking in the direction of the arrows.

The opposite side walls 32, 33 of the control mount 31 are provided with a plurality of aligned bores 46 by means of which control elements 47, indicated by broken lines in Figures 2 and 3, are supported between the side walls 32, 33. A plurality of toggle switches 48, indicated by broken lines in Figures 2 and 3, are mounted in the bores 45 in a position to be operated when the door 28 is open.

In the use and operation of the invention, the control members 47 and switches 48 are secured in the control mounting 31 and are conventionally wired into the electric circuit of the truck tractor. The control mounting 31 is then inserted in the receptacle 10 sufficiently so that the detent blocks 40 engage over the spring fingers 30 to lock the control mounting 31 within the container 10.

When the tractor trailer is assigned to a specific tractor for a specific trip, the toggle switches 48 are operated by a responsible party to set the control elements 47 to accommodate the voltage requirements of the trailer. After the switches 48 have been set, the door 28 is closed and secured in closed position by the element 43 projecting through the bores 42.

No means are provided in the container 10 for permitting the disengagement of the spring fingers 30 from the detent blocks 40, and thus, the control mounting 31 can not be removed from the container 10 without leaving visible evidences of the fact that the container 10 has been tampered with.

Having thus described the preferred embodiment of the invention, it should be understood that numerous structural modifications and adaptations may be resorted to without departing from the scope of the appended claims.

What is claimed is:

1. A safety container for voltage control units comprising a generally rectangular box having spaced apart front and rear walls, spaced apart opposite side walls, a top wall, said box having the bottom thereof open, said front wall having a rectangular opening formed therein adjacent the lower edge thereof, a door, means hingedly securing said door to said front wall whereby said door may be swung into closing position with respect to said opening, a generally rectangular control mount slidably positioned within said box, said control mount having a plurality of bores for receiving electrical cables, oppositely disposed spring arms mounted on the inner surfaces of said side walls, detent blocks carried on said control mount engageable with said spring arms for securing said mount within said box, and means securing said door in closing position with respect to said opening in said front walls.

2. A device as claimed in claim 1 wherein said control mount includes a pair of oppositely disposed channel-shaped side walls, and a bottom wall extending between the lower ends of said side walls and secured thereto.

3. A safety container for voltage control units comprising a generally rectangular box having spaced apart front and rear walls, spaced apart side walls and a top wall, said box having the bottom thereof open, said front wall having a rectangular opening formed therein adjacent the lower edge thereof, a door, means hingedly securing the upper edge of said door to said front wall whereby said door may be swung into closing position with respect to said opening, a generally rectangular control mount slidably positioned within said box, said mount having a pair of oppositely disposed channel-shaped side walls and a bottom wall extending between the lower ends of said side walls and fixedly secured thereto, said bottom wall having a plurality of bores extending therethrough for receiving electrical cables therethrough, a switch panel mounted on said bottom wall and accessible through said door, oppositely disposed spring arms mounted on the inner surfaces of said side walls, detent blocks carried on said channel shaped side walls engageable with said spring arms for securing said mount within said box, and locking means securing said door in closing position with respect to said opening in said front walls.

References Cited in the file of this patent

UNITED STATES PATENTS

| 1,590,957 | Schaffner | June 29, 1926 |
| 1,930,180 | Naylor | Oct. 10, 1933 |
| 2,023,154 | Trotter | Dec. 3, 1935 |
| 2,303,598 | Alley | Dec. 1, 1942 |
| 2,446,141 | Parsons | July 27, 1948 |
| 2,759,623 | Hammrquist | Aug. 21, 1956 |

FOREIGN PATENTS

| 1,094,114 | France | Dec. 1, 1954 |